United States Patent

[11] 3,545,615

| [72] | Inventor | George H. Duffield<br>Heys Head, Hedgerow, Pott Shrigley,<br>Macclesfield, Cheshire, England |
|---|---|---|
| [21] | Appl. No. | 709,755 |
| [22] | Filed | March 1, 1968 |
| [45] | Patented | Dec. 8, 1970 |
| [32] | Priority | March 3, 1967 |
| [33] | | Great Britain |
| [31] | | No. 10284/67 |

[54] HANDLING OF FLOWABLE MATERIALS
10 Claims, 7 Drawing Figs.

[52] U.S. Cl. ............................................. 210/73,
210/196, 210/253, 210/333, 210/341, 210/405
[51] Int. Cl. ............................................. B01d 33/38
[50] Field of Search ............................................. 210/345,
340, 341, 323, 73, 101, 405, 196, 333

[56] References Cited
UNITED STATES PATENTS

| 563,660 | 7/1896 | Gaillet | 210/101 |
| 665,606 | 1/1901 | Kennicott | 210/101 |
| 1,290,538 | 1/1919 | Gamble | 210/101 |
| 2,082,847 | 6/1937 | Petty | 210/73 |
| 2,301,025 | 11/1942 | Friend et al. | 210/405X |
| 2,504,610 | 4/1950 | Wolf | 210/341 |

Primary Examiner—John Adee
Attorney—Cushman, Darby & Cushman

ABSTRACT: Material-handling apparatus, such as filtration and extraction plants, normally include large, heavy units which undergo movement. The invention improves on known apparatus by providing a distributor arrangement in a material-handling apparatus, in which a rotating or other moving supply outlet for the material discharges it to a compartmented vessel, so that the material is divided into a number of portions which are subjected successively to filtration, extraction or other treatment. The moving parts are small in relation to the overall apparatus.

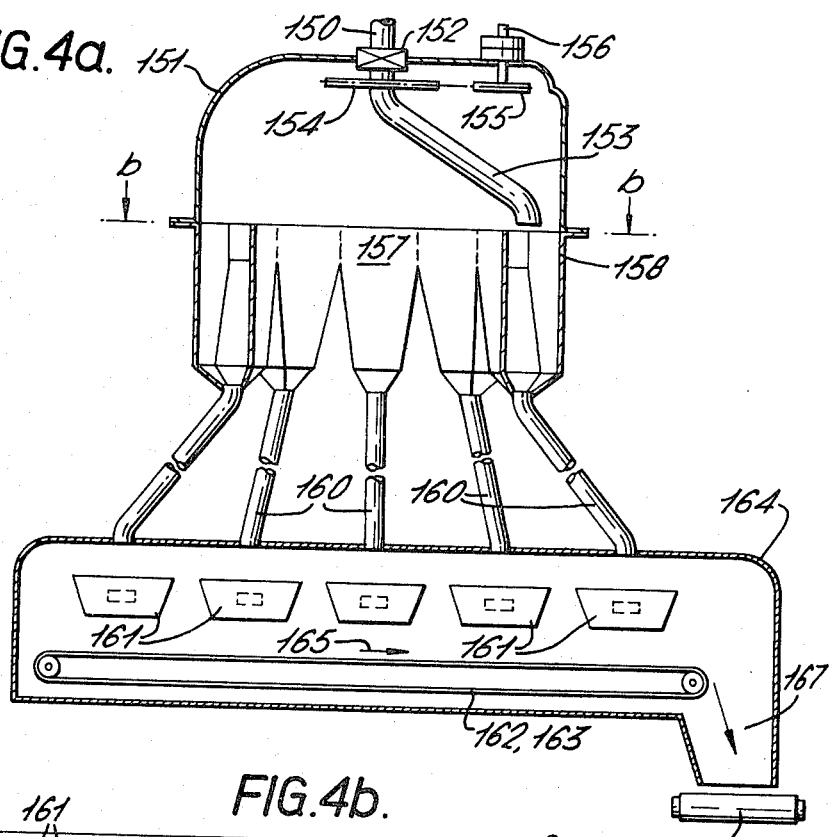
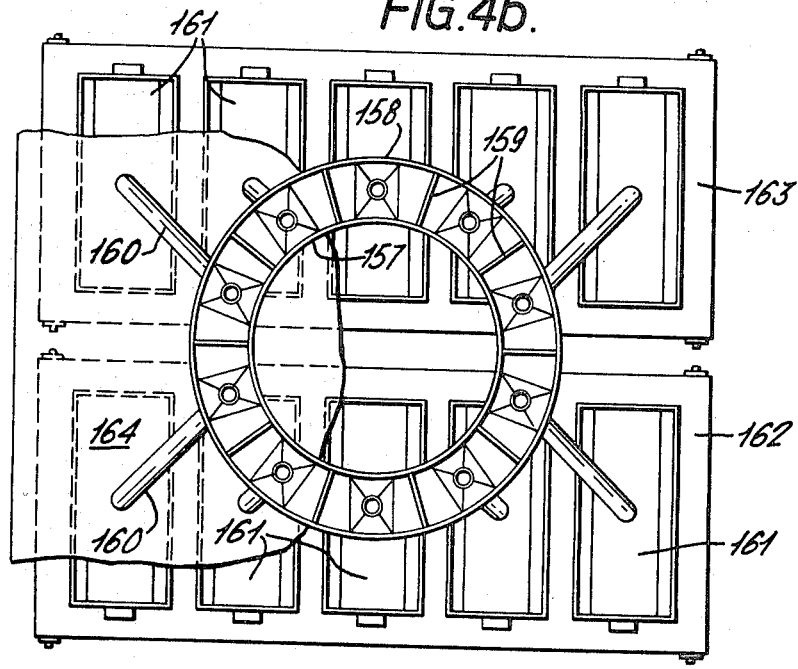

HANDLING OF FLOWABLE MATERIALS

This invention relates to methods for handling flowable materials and is concerned in particular with methods of filtration, extraction and other processing of materials, including liquids and flowable compositions such as slurries and liquors, in which solid materials and liquid materials are separated from one another. The invention also relates to improved apparatus for carrying out such methods.

A typical material which is freely filterable is brewers mash, used in the production of wort. In brewing, this may be processed continuously or discontinuously in a filtration or extraction plant. In known plant used for this purpose the brewers mash is processed in stationary vessels, in which a filter bed is built up and large quantities of wash liquors are passed through, because of the need for an efficient and thorough extraction. After this step, the resultant solids are discharged manually or, sometimes, by means of a scraper. This has the disadvantages that the process is slow and cumbersome, as the plant has to effect each step in turn and a relatively large and stationary apparatus has to handle large volumes of materials.

Another known form of apparatus used in this and other material-handling processes is the tipping-pan filter. This essentially consists of an annular series of buckets or other containers which rotate about a central vertical axis. Solids to be extracted, i.e. in the form of a slurry or other flowable material, are charged at a location into the buckets, which then rotate from the charging location to another location, where the solids collected in the buckets are washed in countercurrent until the necessary extraction has been achieved. The rotation of the buckets then brings each one in turn to a location where the collected cake of solids is removed from each successive pan, which are arranged to tilt at this location so that the solids fall into a receptacle or other collector or are discharged by being washed out. This form of apparatus has the considerable disadvantage that a relatively large and heavy unit, comprising the tipping pans or extraction chambers and their supporting members and also the materials being processed, has to be rotated continuously or discontinuously so that design, manufacture and maintenance of such apparatus are made undesirably complicated.

In known rotary tipping-pan filters, for the production of brewers wort, this control can be provided by means of stand pipes which are constructed so that they can be adjusted in height in order to maintain a predetermined pressure differential. This requirement adds to the cost and complexity of the plant. In pressure filters, such a control is sometimes achieved by throttling on the discharge side or on vacuum filters by means of control or differential valves.

It is an object of the invention to provide an improved form of apparatus for handling flowable materials so as to effect separation of solid and liquid components of such materials; this apparatus can be designed for a wide variety of processes involving extraction, filtration and other processing operations on flowable materials and, in particular, for processes of the kinds mentioned above. It is also an object of the invention to provide improved material-handling processes.

According to one aspect of the invention, an apparatus for handling a flowable material comprises at least one annular stationary vessel disposed about an upright axis and divided into a series of feed chambers, a plurality of material-handling vessels each associated with one of the feed chambers, at least one distributor chamber for receiving the flowable material and a duct connected between the distributor chamber and the stationary vessel, the outlet from the duct being mounted for movement about the upright axis so as to distribute material successively to each of the series of feed chambers in the stationary vessel.

In accordance with one feature of the invention, the distributor chamber is mounted for rotation about the upright axis with the duct, the rotation preferably taking place continuously, so that the material is continuously fed in an arcuate path to each successive one of the two or more feed chambers into which the annular stationary vessel is divided.

In a preferred embodiment of the invention, the apparatus includes two, three or more annular stationary vessels, each of which is divided in a series of chambers, at least one plurality of material-handling vessels associated with at least one of the series of chambers, and a number of distributor chambers each rotatable with its associated duct about a common upright axis, each distributor and its duct serving to direct material into a different one of the annular vessels.

One considerable advantage of the apparatus of the invention is that the major components are stationary, so that no large power consumption is required, as is the case in apparatus where large components have to be driven.

According to another aspect of the invention, a method of treating a flowable material comprises the steps of annularly distributing a body of the material about an upright axis, subdividing the annularly distributed material into a plurality of portions and successively subjecting the separate portions of the material to treatment.

In a preferred embodiment of the method, a flowable material comprising liquid and solids in a mixture is annularly distributed by rotating in a horizontal plane about an upright axis the outlet from a supply duct for the material, the annularly distributed material is subdivided into a plurality of portions of the material, the portions are individually treated so as to separate the liquid and the solids and, if desired, the resultant individual portions of the liquid or of the solids are recombined.

The material-handling apparatus of the invention may be arranged to provide for movement of the materials therethrough under the action of gravity. Alternatively, with appropriate enclosure of components of the apparatus, it can provide for movement of the material under the control of vacuum or of elevated pressure and, in general, any desired combination of these means for causing movement of the materials can also be employed. Some of these means and combinations of means are exemplified in the embodiments described below in relation to the drawings herein. In relation to filtration, as a particular form of material separation for which the invention is excellently suited, the following general operating considerations can apply: *a.* Gravity For the filtering of free-draining solids or those for which a limited differential pressure is required, the apparatus can be operated by gravity, using the distributor to feed to filtering chambers or vessels, the feed slurry being poured into them and a head being maintained to cause filtration. The magnitude of this head can be readily controlled by throttling on the inlet side or discharge side or by an arrangement of variable weirs or overflows which can be changed in height and controlled by the distributor shaft, for instance.

b. Vacuum

For vacuum operation, the filtrate side of the filtering medium would be subject to reduced pressure, thus causing a flow of filtrate through the filtering elements. The application of vacuum to the filter elements is desirably controlled by means of a rotary or ring valve or by automatically operated valves.

c. Pressure Operation

The distributor and collecting chambers are enclosed and the feed arranged to pass to the distributor under pressure. A pressurizing gas could also be applied. The differential pressure necessary for driving filtrate through the filter plates or other elements is discharged through a face ring or automatically operated valves.

The feed distributor chamber can be arranged to take the feed of the material either continuously or batchwise; if necessary, the distributor chamber can take the form of a main feeder vessel arranged to have a holding volume by being constructed of sufficient capacity to allow for continuous feed from it to the outlet duct and to the feed chambers, and also to allow for the main feeder vessel itself to be fed batchwise, e.g. from a preceding plant or operation.

The distributor can also be arranged to feed batchwise to the filtering chambers or other material-handling vessels by means of automatically operated valves or a face or ring valve mounted on the distributor shaft.

The distributor chamber need not be mounted centrally of the apparatus nor need the filtering chambers or other material-handling vessels be arranged in a circle round it. The distributor chamber can be mounted to one side and can be arranged to distribute the material, for instance, to a line of vessels or to two or more lines of vessels arranged for example in parallel row formation or in a rectangular or other array. An advantage of arranging the vessels in a line or lines is that they can be readily arranged to discharge on to a band or similar conveyor located, for instance, under the line or lines of vessels.

In the case of tipping pan filters, the pans can be arranged to tip on to conveyors or if mounted round the distributor can be arranged to tip into a central container, chute or hopper.

For wet discharge of filter elements of the tube, cartridge and plate types, a residual heel may be left in the chamber or it can be discharged with the filter cake, achieved by such means as blow-back, wash-back or vibration. Alternatively, the filter cake can be discharged through an automatically operated valve or a port provided in a face or ring valve. For dry discharge, the apparatus incorporates a large-bore valve, of the slide valve or butterfly valve type for example, which is arranged to open to allow discharge to occur; alternatively, the bottom cover plate of the element can be opened for instance by moving a locking ring from a "closed" to an "open" position or by actuating some other form of securing device.

In the case of filters of the tipping pan type, drainage of liquid can be by gravity, vacuum or pressure and, on tipping to empty the filter cake from the pan, a blow-back can be employed, if required, depending upon the nature of the filter cake.

In order that the invention may be readily understood, certain embodiments of it are described below, by way of example only, in conjunction with the accompanying drawings, in which:

FIGS. 4a and 4b show two views of an embodiment of the invention as adapted to a tipping-pan filter, FIG. 4a showing a diagrammatic side view of the main components only and FIG. 4b showing a similarly diagrammatic plan view;

Figure 1:
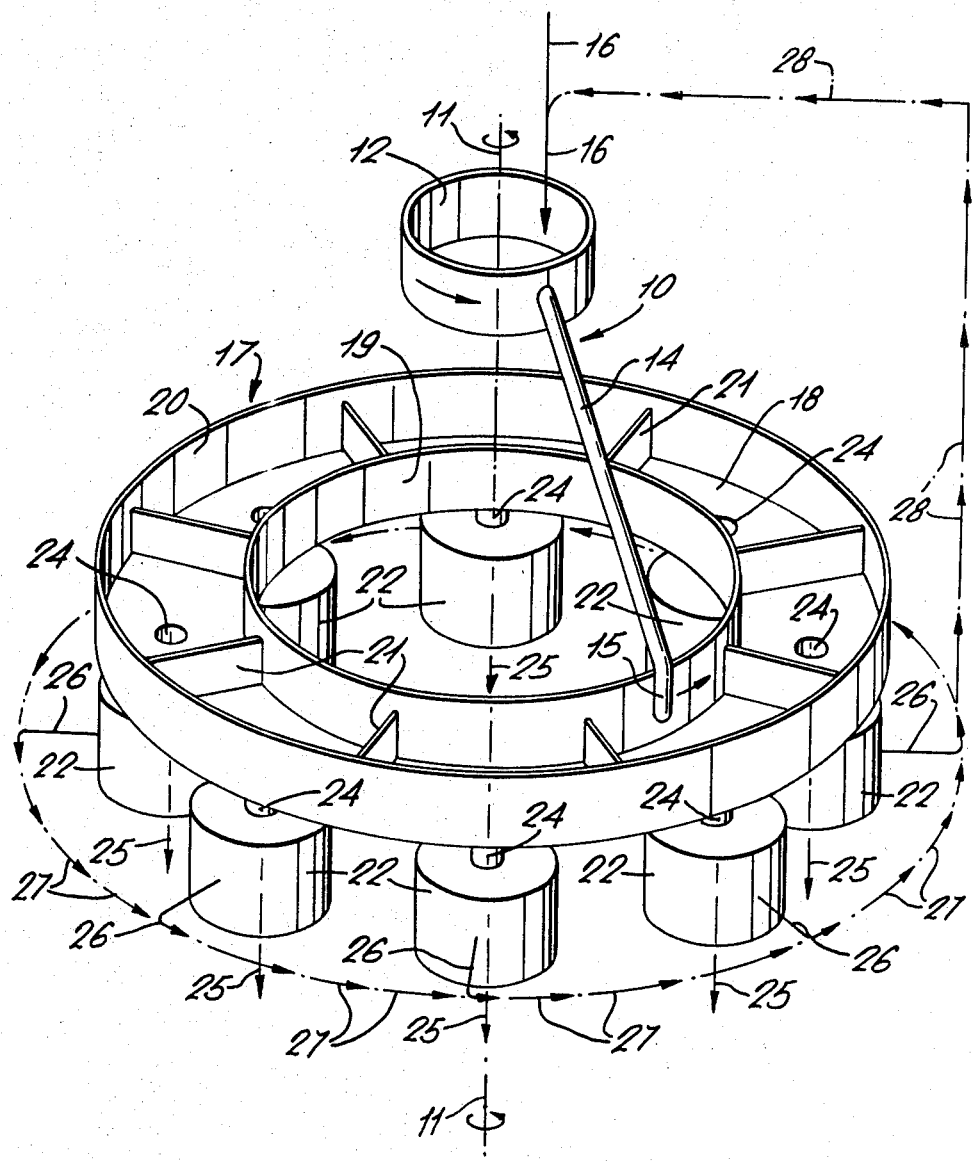
FIG. 1 shows in diagrammatic perspective view a very simple form of apparatus of the invention.

Referring to FIG. 1, a simple embodiment of an apparatus according to the invention is shown in highly diagrammatic form and in perspective view. This apparatus includes a rotatable, flowable material distribution assembly shown generally at 10. This is rotatable about an upright axis 11, 11 and consists of a distributing chamber 12 having connected to it a distributor duct 14. Rotation of the assembly 10 causes the outlet end 15 of the duct 14 to trace a circular path in a horizontal plane about the axis 11, 11. When a flowable material, which can be a liquid or a slurry, but does not include a gas or a solid material in massive form, is fed into the chamber 12, as indicated by the arrow 16, the material is annularly distributed by reason of the rotation of the duct outlet end 15.

Mounted coaxial with the assembly 10 is an annular stationary vessel 17, which has the form of an open ended annulus disposed below the locus of motion of the duct outlet end 15. As shown, the vessel 17 comprises an annular base plate 18, a cylindrical inner wall 19 and a cylindrical outer wall 20. The vessel 17 is subdivided into a number of chambers or compartments by means of partition walls 21. Eight walls 21 are shown extending across the base plate 18 between the walls 19 and 20 and so forming a series of eight compartments, though fewer or more than eight can be provided as required. Each of the compartments serves as a feed chamber, for directing the flowable material, annularly distributed by the assembly 10 in the series of feed chambers, into a series of material-handling vessels. These are shown as cylindrical tanks 22 (though any other shape or kind of vessel can be provided as required) and each tank 22 is disposed beneath one of the compartments in the vessel 17 and is connected to it by a duct, some of which are shown at 24. The tanks 22 are provided for effecting the desired handling of the flowable material, such as the filtering of a slurry, the extraction of one material from another by means of solvents or other processing operations.

In operation, the relatively small part of the apparatus constituted by the assembly 10 is rotated, the flowable material, e.g. a slurry of particulate solid material in a liquid to be filtered, is fed in as shown by the arrow 16 and is annularly distributed by the chamber 12 and duct 14 in the vessel 17. In this, the slurry is subdivided by the partition walls 21 into portions and each portion of the slurry is fed from its compartment via the duct 24 to the associated tank 22, which in this instance is equipped as a filter unit. In each of the tanks 22, the slurry portion is filtered to separate the liquid from the solid or, at least, the major part of the solid. The filter cakes can be periodically or individually discharged from the tanks 22, as indicated by the downward arrows 25. The liquid filtrates, which may contain fine solid particles, can be periodically or continuously discharged from the tanks 22, as indicated by the outward arrows 26. These filtrates can if desired be combined, as indicated by the circulating arrows 27; also, the combined filtrates may be sent for further processing or may be recycled to the distributor chamber 12, as indicated by the chain-dotted arrows 28.

Figure 2:
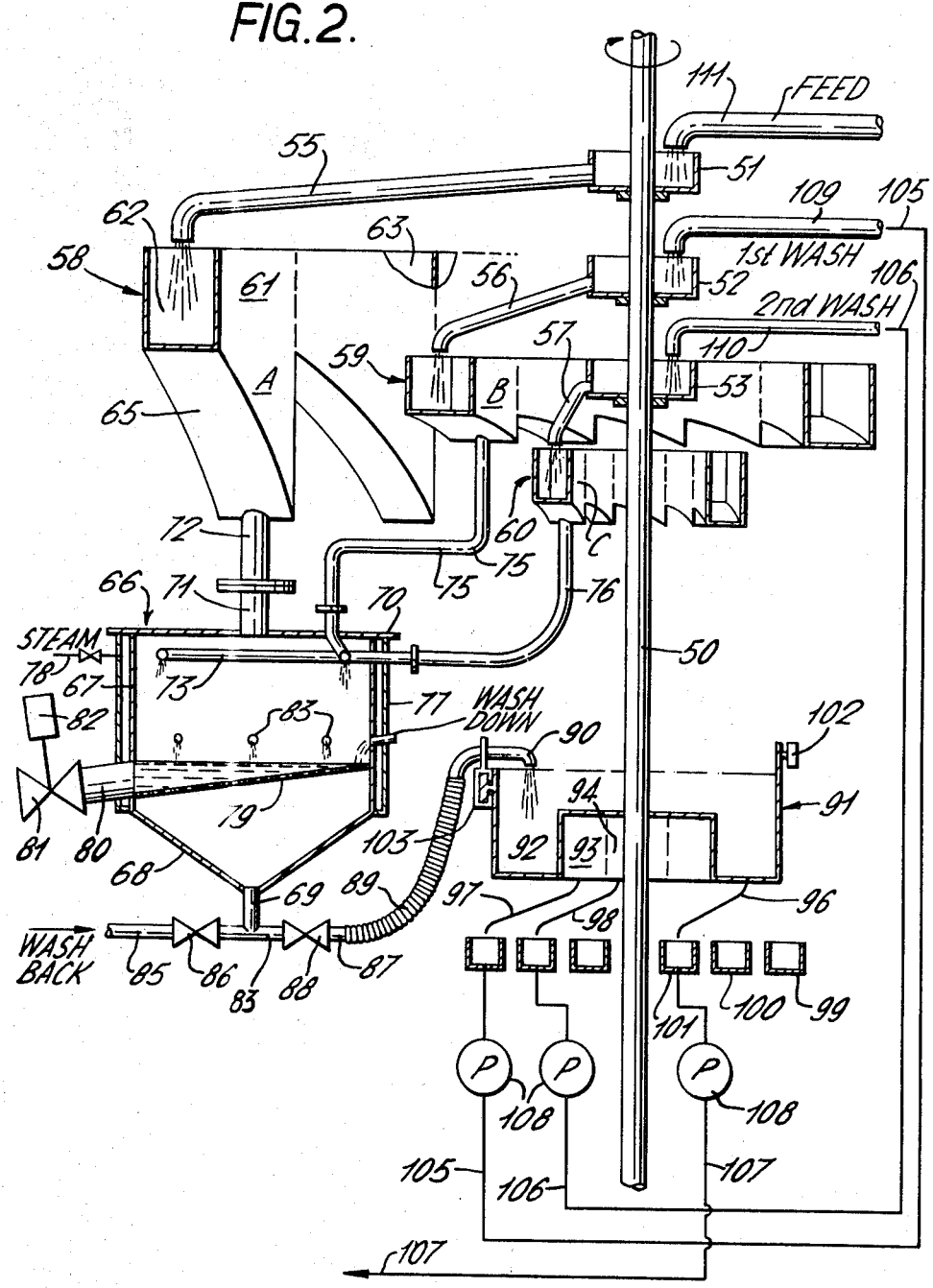
FIG. 2 shows also diagrammatically another form of apparatus of the invention, involving distribution under gravity and filtration under pressure.

Referring now to FIG. 2, a different embodiment is shown in diagrammatic side view. A central upright shaft 50 has mounted on it the components which constitute the rotatable part of the apparatus. These include a stack of distributor chambers, three of which are shown, at 51, 52 and 53, which have the form of annular compartments rotating with and located round the upper part of the shaft 50. Each chamber 51, 52, 53 has a radially extending distributor duct 55, 56, 57 which extend to different radial distances from the axis of the shaft 50.

Each of the ducts 55, 56, 57 has its discharge end located above a stationary annular vessel, the duct 55 extending from the uppermost chamber 51 to the outermost vessel, shown at 58, the duct 56 extending from the middle chamber 52 to the middle vessel, shown at 59, and the duct 57 extending from the lowermost chamber 53 to the innermost vessel, shown at 60.

Each of the vessels 58, 59, 60 is subdivided into a plurality of feed chambers. These can comprise a section of the inner and outer walls 61, 62 forming the vessel, e.g. the vessel 58, an upright partition wall 63 and an inclined base wall 65, so that each feed chamber allows for ready drainage of a flowable material to the lowest part of the chamber. Each of the vessels 58, 59, 60 is desirably subdivided into the same number of feed chambers, e.g. 10, so that three separate feed chambers, each only taken from the series constituting one of the three vessels, 58, 59, 60, are associated with one of a series of 10 stationary treatment chambers, one of which is indicated at 66.

In the embodiment shown, the treatment chamber 66 is a filtering or extraction chamber. It comprises a cylindrical body 67 having a conical base portion 68, terminating in a drain connection 69, and a removable flat cover 70. This includes a flanged union 71, which is joined to the lower flanged end of a pipe 72 extending down from the lowest part of one of the chambers A of the outermost annular vessel 58. Within the body 67, the chamber 66 is fitted with a circular spray pipe 73 for distributing liquid over the cross section of the chamber. This spray pipe 73 is connected to one of the chambers, B, of the middle annular vessel 59, by means of a pipe 75 and is connected to one of the chambers, C, of the innermost annular vessel 60, by means of a pipe 76. The cylindrical body 67 is surrounded by a steam jacket 77 having a steam inlet 78 and is fitted immediately above the base portion 68 with an inclined filter screen or filter plate support 79. This slopes toward a wide outlet pipe 80 connected to a valve 81 actuated by control mechanism 82. Above the rim of the screen or support 79, a number of wash liquid inlet pipes 83 pass into the chamber 66 through the cylindrical body 67 and the jacket 77 and serve to wash filtered material toward the outlet pipe 80.

The drain connection 69 is connected to a T line 83 having one branch 85 connected via a control valve 86 to a source of back-wash liquid, for instance, and the other branch 87 connected via a control valve 88 and a flexible hose 89 to a filtrate outlet pipe 90. This discharges into a central collection tank 91, which in the embodiment shown, is mounted for rotation on the shaft 50. This tank 91 consists of three concentric annular compartments 92, 93, 95, each of which discharges via outlet pipes 96, 97, 98 to one of three stationary annular troughs 99, 100, 101 located under the tank 91. The rim 102 of the tank 91 can be constructed as a camming surface cooperating with a fixed or movable guide member 103 to control the height of the tank 91 and therefore of the end of the outlet pipe 90, whereby the pressure on the underside of the plate 79 can also be controlled. Also, the radial location of the end of the pipe 90 can be controlled so that discharge takes place into a selected one of the compartments 92, 93, 95. Each of these is connected to an outlet pipe 105, 106, 107 which each include a pump 108. The pipe 105 from the outermost trough 99 is connected to a first wash inlet pipe 109 discharging into the distributor chamber 52 for the middle vessel 59, the pipe 106 from the middle trough 100 is connected to a second wash inlet pipe 110 discharging into the distributor chamber 53 for the innermost vessel 60 and the pipe 107 from the innermost trough 101 is connected to a receptacle (not shown) or a drain. The distributor chamber 51 for the outermost annular vessel 58 has arranged by it a feed pipe 111 for feeding the slurry or other material to be processed to the apparatus.

In operation, the shaft 50 is rotated, together with the chambers 51, 52, 53, their ducts 55, 56, 57, and the tank 91. Steam is supplied to the jacket 77 of each of the tanks 66 and the slurry is fed to the apparatus via the pipe 111. The duct 55 annularly distributes the slurry in the vessel 58, where it is subdivided into portions in the individual feed chambers, of which A is one. The portions pass down the pipes 72 to the tanks 66, where the solids are separated from the filtrate by the filter member on the plate 79. With the valve 86 shut and the valve 88 open, the filtrate is passed via the hose 89 to the outlet 90 and into, for instance, the compartment 93. From here the pump 108 in the line 105 recycles the filtrate to the chamber 52, from where it is annularly distributed in the vessel 59. If as shown the compartments B are connected to the lines 75, the recycled filtrate passes to the spray pipe 73 and so effects washing or extraction of the solids on the filter plate 79.

The pressure differential across the filter plates 79 can be controlled by the mechanism 102, 103 in the way described. Also, discharge of the liquid portions from the outlets 90 can be made to either of the other compartments 92 and 95 to pass to the line 107 or via the line 106 to the chamber 53.

Removal of the collected solids from the tanks 66 can be effected by energizing the mechanisms 82, if desired in cyclic sequence, so as to open the valves 81 in timed relation to the introduction of wash liquid via the inlets 83. The collected solids can then be washed through the outlet 80 for further handling and, on closure of the valve 81, the tank 66 is ready to receive a further portion of material from its feed chamber A.

Alternative forms of solids removal include backwashing, which can be achieved by opening the valves 81 and 86, closing the valve 88 and introducing a backwash liquid via the line 85. This can be done with water or with filtrate, for instance.

Other collecting arrangements include back-blowing with air or other gas, mechanical removal, e.g. by scraping, and inversion of the filtering chamber.

The invention thus provides simple and effective apparatus and processes for handling flowable materials. It may be summarized as consisting in a principal of operation for feeding slurries or liquids into chambers or annular rings rotated by means of a central shaft. From the annular rings or chambers, feed pipes or chutes pass to a second annular ring subdivided by partitions to form a series of feed boxes, through which the feed flows into a number of stationary chambers arranged around the central shaft. These chambers may be fitted with filter plates through which filtrate drains and solids are collected on a filtering medium. As the central shaft rotates, feed or wash liquors pass to each filtering or extracting chamber in turn. After filtration or filtration washing, the bed or cake may be dried by gravity, vacuum or pressure and the solids discharged by the various means described.

A typical use for a filter or extractor as shown e.g. in FIG. 2 is for continuous processing of brewers mash for the production of wort. This process would involve annularly distributing the brewers mash by gravity feed and arranging recycle wash stages as shown. The required differential head over the filter bed is obtained by the flexible pipes running from the chambers back to the central collecting chamber, the adjustable cam device being arranged to make the drain pipes rise and fall in a predetermined manner to obtain the required differential head.

Another application of the apparatus of the invention is, for example, the filtration, washing and dewatering of gypsum produced in the manufacture of phosphoric acid or by the treatment of calcium salts of organic acids with sulferic acid. In such operations, it is desirable to obtain a mother liquor as concentrated as possible and to remove all possible traces of the original acid from the calcium sulfate. Such separating and washing operations are carried out conventionally on rotary tipping-pan filters as described above. In carrying out this operation in accordance with the invention, the apparatus is arranged to work with gravity flow, with vacuum being applied to draw the liquor and wash water through the cake or with pressure. Vacuum is applied to the chambers in turn by means of automatically cam or trip-operated valves actuated from the central shaft or by means of a face or ring-type valve. Discharge of the washed or dried cake can be effected by any of the methods described.

For some operations, in which it might be required to maintain the bed of solids being extracted in an agitated state, agitators are fitted into the vessels to maintain a slurry during extraction or for reslurrying the solids for discharge.

Figure 3:
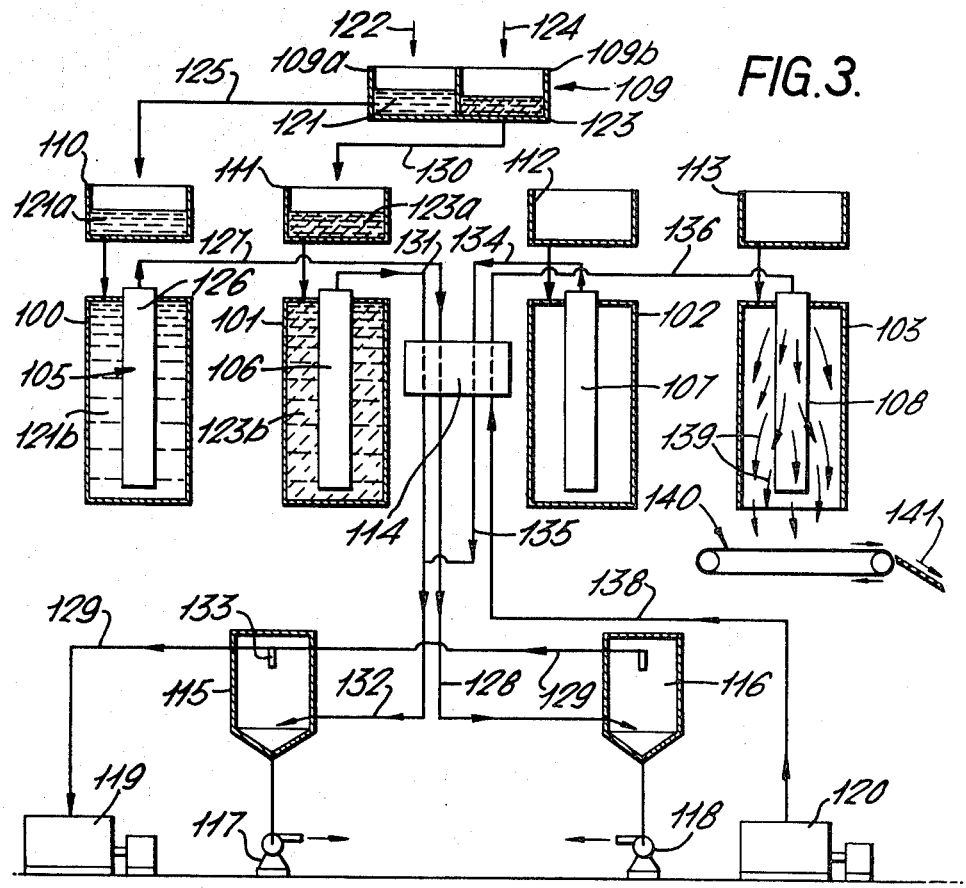
FIG. 3 shows a flowsheet of a simple form of gravity, vacuum or pressure filtering plant according to the invention.

Referring to FIG. 3, this shows a filtration plant including a series of filter elements or plates. In the embodiment shown, the filter plant includes four cartridge-type filter elements 100, 101, 102, 103, each of which is provided with a known type of filter cartridge 105, 106, 107, 108; it will be understood that other types of filter element can also be used and that the cartridge type are shown only by way of example. Above this series of file filter elements 100—103, a rotary distributor is provided, indicated generally at 109, and consisting of a series of compartments of which two are shown at 109a and 109 b in the embodiment indicated in FIG. 3. Each of the series of cartridges filter elements 100—103 is provided with a superposed collector vessel 110, 111, 112, 113, and either or each of the compartments of the distributor 109 is arranged to feed material from it successively to one or other of the collectors 110—113. The cartridges 105—108 of the filter elements are connected via a rotary valve or filtrate collector 114, the construction of which is described in more detail below, and the plant also includes separate receivers 115 and 116 for receiving filtrate and wash liquor respectively, the outlets from the receivers 115 and 116 being coupled to extraction pumps 117 and 118, respectively. The plant also includes a vacuum pump 119 and a compressor 120. FIG. 3 shows the filter plant in a particular stage during the cycle of operations which are carried out in it and it will be appreciated that, in continuous operation, each of the filter elements 100—103 successively undergoes the four different stages which are illustrated for each of the respective elements in FIG. 3. In operation, the compartment 109a of the centrally-mounted rotary distributor 109 receives slurry 121 to be filtered, as indicated by the arrow 122. The other compartment 109b receives wash liquor 123 as indicated by the arrow 124. During the phase of operation illustrated, the compartment 109a is connected via a line 125 with the collector 110 of the first filter element 100. A storage volume of the slurry to be filtered is therefore supplied to and contained in the vessel 110 as indicated at 121a. Slurry from the collector 110 is supplied to the first filter element 100, as indicated at 121b. Filtration takes place in the element 100 and a filter cake (not shown) forms upon the cartridge 105, whilst filtrate indicated at 126 is fed via a line 127 to the filtrate collector 114 and is supplied from there via a line 128 to the filtrate receiver 116. Filtrate is extracted from the receiver 116 by its extraction pump 118. The space within the f ltrate receiver 116 standing above the body of filtrate in it is connected via a line 129 to the vacuum pump 119.

While filtration is taking place in the first filter element 100, washing of the filtrate collected during the previous cycle is proceeding in the second filter element 101. The wash liquor 123 contained in the compartment 109b is supplied via a line 130 to the collector 111 of the second filter element 101. The volume of wash liquor stored in the vessel 111 is indicated at 123a and this maintains a supply of wash liquor indicated a 123b in the filter element 101 which washes the filter cake (not shown) which has previously formed upon the filter cartridge 106. After washing the cake on the cartridge 106, the wash liquor is conveyed via a line 131 to the rotary valve 114 and from there via a line 132 to the wash receiver 115. This is of similar construction to the filtrate receiver 116 and its lower outlet is connected to a second extraction pump 117. Also, the free space at the head of the wash receiver 115 is connected to the vacuum pump 119 by a branch connection, as indicated at 133, and the line 129. In normal operation, wash liquor from the extraction pump 117 is recycled through a suitable bulk storage receptacle (not shown) which forms the supply for delivering wash liquor via the arrow 124 to the distributor 109 as previously described.

The third filter element 102 is undergoing drying of the washed filter cake which has formed upon its cartridge 107. Consequently, in this phase, no liquid is supplied to the collector 112 and the cartridge 107 is connected via a line 134 to the rotary valve 114 and from there via a line 135 to the line 132 by which wash liquor is delivered to the wash receiver 115. In this way, air or other drying gas for the filter cake on the cartridge 107 is drawn, by the suction effect of the vacuum pump 119 acting upon the wash receiver 115, into the third filter element 102 and this drying air or other gas passes through the filter cake on the cartridge 107 and causes the requisite drying of the product to take place.

Finally, in the same phase of operation, removal of the dried filter cake is taking place in the fourth filter element 103. For this purpose, the cartridge 108 is connected via a line 136 to the rotary valve 114 and from there via a line 138 to the compressor 120. At the same time, a locking mechanism or valve mechanism (such as described before) is operated so as to open the bottom of the filter element 103. Blow-back gas provided under pressure by the compressor 120 is thus supplied via the line 138 and the line 136 to the filter cartridge 108 and this gas causes the filter cake upon the cartridge 108 to be blown off as indicated by the arrows 139 for discharge from the apparatus. By way of illustration, the discharged filter cake is shown as being collected on a belt conveyor 140 which delivers the dried filter cake to an outlet point, as indicated by the arrow 141.

After operation of a complete cycle in which filtering takes place in the filter element 100, washing in the filter element 101, drying in the filter element 102 and filter cake discharge in the element 103, the apparatus is operated so as to pass to a second cycle in which filtration takes place in the filter element 103, washing in the filter element 100, drying in the filter element 101 and blow-back discharge in the filter element 102. The valve 114 operates to each filter element 100—103 in turn to the appropriate one of the receivers 115 and 116 and the compressor 120.

One advantage of the filter apparatus of the invention of the kind illustrated in FIG. 3 is that the filter cakes can be built up so as to be thin or thick as required and these can be treated with large volumes of wash liquor or subjected to long drying cycles or the various kinds of treatment steps in the overall process can be varied at will over very wide limits. The apparatus can alternatively be arranged so that washing of the collected filter cakes takes place countercurrently. It can be readily seen that the major components of the apparatus remain stationary throughout the treatment cycle and the only movable parts of importance consist of the distributor 109, the moving parts of importance consist of the distributor 109, the moving parts of the rotary valve 114 and the removable bottom ends to the filter elements 100—103.

FIGS. 4a and 4b illustrate in diagrammatic side view and plan view, the latter being taken along the line b–b of FIG. 4a, a simple form of rotary distributor according to the invention in conjunction with a multiple tipping-pan filter. As shown in FIG. 4a, the apparatus includes an inlet 150 for material to be handled which is provided at the upper central part of a housing 151. The inlet 150 communicates via a rotary connection 152 with a distributor pipe 153 which can be rotated by means of a gear ring 154 coupled to a driving pinion 155, the driving shaft 156 of which is coupled to an electric motor or other source of power (not shown). It will be appreciated that the appropriate means are provided for ensuring that the material to the inlet 150 passes completely to the distributor pipe 153 and the necessary seals and connections are, of course, provided in the normal way. Operation of the electric motor or other power source attached to the shaft 156 causes rotation of the gear ring 154 and consequently the outlet at the bottom end of the distributor pipe 153 executes a circular path and thus effects annular distribution of the material which is supplied to the inlet 150.

The housing 151 is attached at its lower periphery to a circular channel member consisting of an inside wall 157 and an outside wall 158, partitions being provided between the walls 157 and 158 as shown in FIG. 4b at 159 and dividing the annular channel into a plurality of downwardly convergent compartments which can be best seen in FIG. 4a. As shown in both FIGS. 4a and 4b, the ring-shaped receptacle constituted by the walls 157 and 158 and the partitions 159 is divided into ten arcuate segments which are supplied in sequence with the material being handled by the continuous rotation of the outlet end of the pipe 153.

FIG. 4b illustrates that it is not necessary for the vessels, such as filter elements, to which the material is then distributed to be similarly arranged in a circular manner. In the embodiment illustrated, the outlets from the compartments are connected via downwardly directed pipes 160 to a plurality of tipping-pan filters 161 which, as shown in FIG. 4b, are arranged in two rows of five each. Each row of five tipping-pan filters 161 is arranged above a conveyor belts 162, 163 with their supporting rollers and the tipping mechanisms for the pans are arranged in an elongated housing 164. This can be supplied with, for example, heated air for drying or some other controlled atmosphere for treating the product which collects in the filter pans. The conveyor belts 162, 163 operate in the direction of the arrow 165, FIG. 4a, and material delivered to the conveyor belts by the tipping pans 161 during each tipping operation is delivered as shown to a further conveyor 166 located beneath a downwardly directed outlet 167 forming the end portion of the housing 164.

Figure 5:
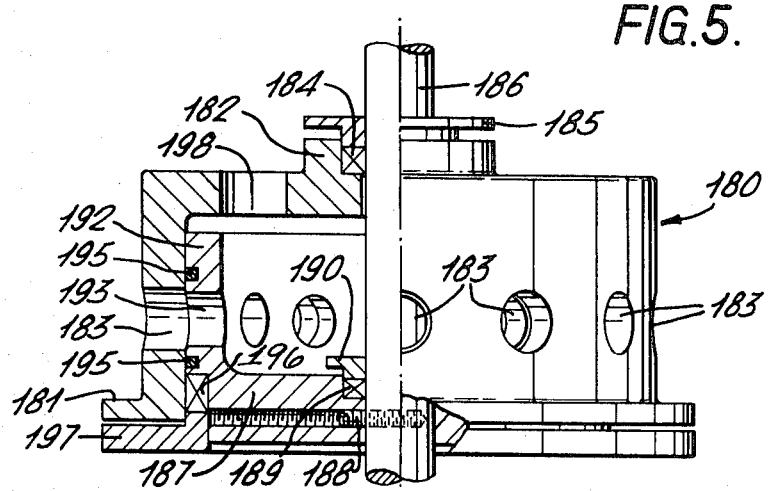
FIG. 5 shows partly in elevation and partly in sectional view one possible form of rotary valve for use in connection with a pressure-operated distribution-system.

FIG. 5 illustrates in elevation on the right and in vertical sectional view on the left one possible form of rotary distributing valve for use with the various kinds of material-handling apparatus of the invention. A valve such as that illustrated in FIG. 5 is of considerable advantage where it is desired to construct or adapt a plant so as it can be used for operation other than under atmospheric pressure, i.e. other than with gravity feed of the materials concerned. As shown in FIG. 5, the valve consists of a stationary outer cylindrical housing 180 of cap shape having an outwardly directed flange 181 at its lower periphery and a central boss 182 formed in the centre of its upper face. A plurality of ports 183 are provided in the upstanding side wall of the outer housing 180. Within the central boss 182 a gland is provided consisting of a conventional sealing ring 184 and gland washer 185. A vertical shaft 186 passes through the gland and will be coupled by means (not shown) to a suitable source of rotary power such as an electric motor. A cup-shaped valve member 187 is mounted for rotation within the housing 180 and includes a generally circular base having a central aperture through which the shaft 186 passes, the base 187 being secured to the shaft 186 by means of a grub screw 188. A sealing ring 189 and compression washer 190 are provided around the aperture in the base of the valve member 187 includes an upstanding wall 192 having a single port 193 therein and it is arranged to rotate upon the shaft 186 with its outer surface in face-to-face contact with the inside surface of the cap-shaped member 180. A pair of seal rings 195 are provided in circumferential grooves formed within the outer surface of the upstanding wall 192, one seal ring 195 being provided above the line of the ports 183 and the other being provided below the line of the ports 183. Also a seal ring 196 is provided at the lower periphery of the wall 192 and is held under compression with a flange ring 197 bolted to the flange 181 of the cap-shaped member 180. A single entry port 198 is provided in the upper surface of the cap-shaped member 180 within the upstanding wall 192.

In operation, the shaft 186 is driven so as to rotate slowly and this causes slow rotation of the valve member 187 so that the single port 193 undergoes continuous rotation inside of the cap-shaped member 180 and successively comes into register with each of the ports 183 therein. Material supplied via the entry port 198 passes into the cup-shaped interior of the valve member 187 and then passes via the port 193 to the respective one of the series of ports 183 with which the port 193 is in register. The speed of rotation of the shaft is, of course, kept sufficiently low to ensure that the requisite amount of material is supplied via the port 193 and each respective one of the ports 183 for the separate treating vessels (not shown) which are connected to each of the ports 183 to receive an adequate charge of the material.

Figure 6:
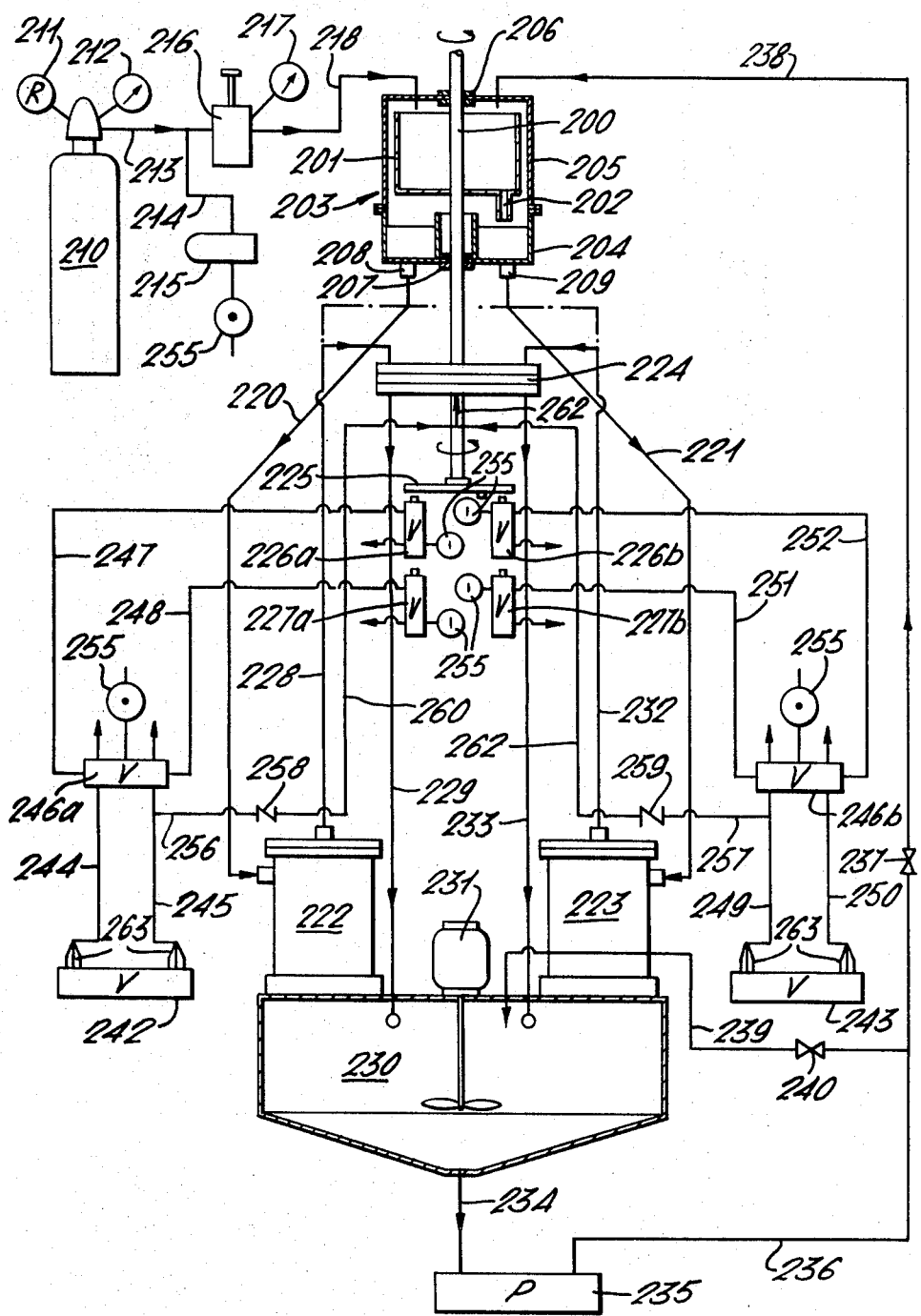
FIG. 6 shows in semiflowsheet form a two-pot pressure-operated filtration or other material-handling apparatus in accordance with the invention.

Referring now to FIG. 6, this shows in diagrammatic flowsheet form the main components in a two-pot apparatus for use in the handling of materials, for instance filtration or extraction. A vertical shaft 200 is mounted for rotation by a source of power (not shown) and carries a feed box 201 in the form of an open-topped cylindrical drum-shaped container having an outlet 202 in its base. The feed box 201 rotates within a pressure vessel, generally indicated at 203, consisting of a distribution box 204 and a cover member 205. The cover member 205 includes a flange at its lower periphery for mating with a corresponding flange on the distribution box 204 and also includes a suitable gland 206 in its upper side for the passage of the shaft 200. Also, in the top of the cover member 205, apertures are provided (as described further below) for inlets to the feed box. A gland member 207 is provided in the base of the distribution box 204 and this is divided into a plurality of compartments, in the present case into two compartments each represented by a semicircular arc of the distribution box 204. Also in the base of the distribution box 204 are a pair of outlets 208, 209, one leading from each of the two compartments. In order to operate the apparatus under pressure, a source of compressed gas, for example, a compressed air cylinder 210, is provided, having at its outlet a pressure regulator 211 and a pressure gage 212. The outlet also connects, via a line 213, with a further pressure regulator 216 having a pressure gage 217 attached thereto and the outlet from the pressure regulator 216 is connected via a line 218 to the pressure vessel 203 containing the feed box 201 and the distribution box 204. The outlet from the air cylinder 210 is also connected via the line 213 and a T junction with a branch line 214 communicating with a lubricator 215. The purpose of the branch line 214 is described below. It will be appreciated from the various embodiments previously described that on rotation of the shaft 200, the feed box 201 undergoes rotation so that its outlet 202 follows a circular path and therefore causes the material delivered to the feed box 201 to be distributed in an annular arrangement to one or other of the two arcuate compartments into which the distribution box 204 is divided. In this way, the material is delivered to one or other of the compartments and whichever one is filled with material then supplies that material under the pressure generated by the compressed air cylinder 210 under the control of the regulators 211 and 216 and delivers it to the outlet 208 or 209. Each of the outlets is connected by a line 220, 221 with a respective one of the two receiving chambers in the two-pot apparatus; the two receptacles are indicated at 222 and 223 respectively.

The shaft 200 passes through the lower gland member 207 in the pressure vessel base and its lower extension carries a rotary valve 224 and a rotary valve actuating cam or plate 225. The cam plate 225 cooperates with a plurality of valves which, in the embodiment shown, consist of four three-port limit valves indicated at 226a and 226b and 227a and 227b respectively. It will be understood that in a way not shown in the diagrammatic drawing of FIG. 6, the four valves 226a to 227b are disposed in an annular arrangement so that the valve cam plate 225 actuates each valve in turn. The upper outlet from the receptacle 222 is connected via a line 228 with the rotary valve 224 and this is also connected via a line 229 with a reslurrying container 230 provided with a mixer-agitator 231. In a similar way, the receptacle 223 is connected via a line 232 with the rotary valve 234 and it is connected via a line 233 with the chamber 230. The material treated in each of the receptacles 222 and 223, for instance a filtered slurry, can therefore be recycled via the rotary valve 224 to the tank 230 from which it can be extracted via a lower outlet 235 leading to a pump 236 which can be used for recycling the material for further reslurrying or can recycle wash liquor or filtrate to the pressure vessel 203. For this purpose, the pump outlet is connected via a line 236 and a shutoff valve 237 to a line 238 which delivers material to the pressure vessel 203. Alternatively, at the upstream side of the valve 237 a branch is taken via a valve 238 and leads to a line 239 which delivers liquid back to the tank 230.

Operation of the outlet valves or openable base plates provided in each of the two receivers 222 and 223 in order to discharge solids collected in either of them to the tank 230 is effected by means of pneumatic or other valves which are indicated at 242 and 243. The stem of each of the valves 242 and 243 is connected to the valve mechanism in the base of the adjacent receptacles 222 and 223 respectively and operation of the valve is effected by means of compressed air under the control of the valves 226a to 227b and corresponding five-way valves coupled between the pair of valves 226a and 227a and the pneumatic valve 242 on the one hand and between the pair of valves 226b and 227b and the pneumatic valve 243 on the other hand. The inlet and outlet of the valve 242 are connected by lines 244 and 245 with a five-way valve 246a which is in turn connected by lines 247 and 248 with the valves 226a and 227a respectively. The other pneumatic valve 243 is connected via lines 249 and 250 with the other five-way valve 246b which is connected in turn via lines 251 and 252 with the valves 226b and 227b respectively. Each of the valves 226a, 226b, 227a, 227b, 246a and 246b have their input connections coupled to the source of compressed air 210 by way of the lubricator 215. This is effected by way of a compressed air network indicated for each of the respective valves at 255; the separated air lines of this network are omitted from FIG. 6 for clarity. Also, a connection is taken from each of the lines 245 and 249 respectively in the form of lines 256 and 257 to nonreturn valves 258 and 259 and lines 260, 261 to a pressure inlet 262 to the output side of the rotary valve 224. Each of the valves 242 and 243 is provided at its two connections to its respective five-way valve 246a and 246b with air pressure regulators, as indicated for each inlet by the reference 263.

In operation, rotation of the shaft 200 causes distribution of the material via rotation of the feed box 201 so that at any given moment material is being fed to one or other half of the distribution box 204. By way of example, material to be treated is being supplied via the outlet 208 and the line 220 to the receptacle 222, which can be a pressure-operated filter element for instance, so that, in this case, the solids in the material being treated are collected upon the filter element and filtrate is taken via the line 228. When a sufficient quantity of solids has been collected in the receptacle 222 or the particular treatment stage has otherwise been brought to completion, rotation of the valve plate 225 opens for example the valve 227a and closes the valve 226a, so as to actuate the valve 246a so as to reverse the position of the valve 242 and open the base of the receptacle 222. The material collected is then discharged into the tank 230. In phase with this, distribution of the material then takes place to the other half of the distribution box 204 so that material is then supplied via the outlet 209 and the line 221 to the receptacle 223 for the collection or other treatment of material therein in the way just described for the receiver 222.

It will thus be seen that the invention provides a great advantage in that the number of components, in what can often otherwise be a complicated and expensive plant, which need to be capable of undergoing rotation or other movement, whether or not they contain the materials being treated, is extremely small. Consequently, only slight power consumption costs are involved and, as the number of moving parts is kept to a minimum, the wear is also minimized. The various forms of apparatus which can embody the invention as illustrated by the foregoing embodiments offer a wide variety of adaptations to other uses.

Operation of the equipment under gravity head or with vacuum applied to the filtrate side of the filter plate is described above and other methods have also been described, in which the incoming feed and/or wash liquor pipes or other connections are connected to the central annular distributor by means of a rotary seal or valve, so that feed and wash lines can be pressurized. At the same time, as illustrated particularly by the embodiment described in relation to FIG. 6 of the drawings, discharge from the system can be obtained by any of the methods previously described and, in particular, by sudden release of pressure prevailing within parts of the apparatus which, as can be seen, can be used to cause sudden release of the pressure in one or other of the receptacles 222 and 223, for instance, so as to cause blowout discharge of the residual solids contained in the particular receiver at the time.

I claim:

1. An apparatus for subjecting to separation a flowable material consisting essentially of liquid and solids comprising:
    a. at least one annular stationary vessel disposed about an upright axis;
    b. partition means in said vessel subdividing it into a plurality of stationary feed chambers;
    c. a plurality of stationary material-handling vessels each associated with one of said stationary feed chambers and adapted to receive from such associated feed chamber flowable material to be separated into solid and liquid in said material-handling vessel;
    d. conduit means interconnecting each of said feed chambers with the respective material-handling vessel and adapted to direct flowable material from said feed chamber to said vessel;
    e. at least one distributor chamber adapted to receive said flowable material from a source thereof;
    f. a flowable material discharge duct connected to said distributor chamber and adapted to direct said flowable material from said chamber to said annular stationary vessel to distribute said flowable material to said plurality of stationary feed chambers; and
    g. means for rotating at least an outlet from said discharge duct about said upright axis for effecting annular distribution of said flowable material to said plurality of feed chambers, said flowable material from said source being distributed by said distributor chamber and said discharge duct to each of said plurality of stationary feed chambers, the portions of flowable material then being separately fed via said conduit means from said feed chambers to the respective stationary material-handling vessels associated therewith for separation within said vessels into solid and liquid components.

2. An apparatus according to claim 1, wherein the discharge duct from the distributor chamber to the annular stationary vessel and the conduit means from the feed chambers to the material-handling vessels are adapted to effect movement of the flowable material therein under the effect of gravity.

3. An apparatus according to claim 1, including means for subjecting at least the distributor chamber to reduced or elevated pressure for effecting movement of the flowable material within the apparatus.

4. An apparatus according to claim 1, comprising a multielement filter plant having a plurality of filter element means for performing a sequence of filtering, washing, drying and solids discharging steps; said filter element means constituting said material-handling vessels.

5. An apparatus according to claim 1, wherein the material-handling vessels are constituted by tipping pan filter elements which are located above filter cake discharge means adapted to receive filter cake from each of a plurality of said filter elements.

6. An apparatus for subjecting to separation a flowable material consisting essentially of liquid and solids comprising:
    a. a plurality of concentric annular stationary vessels disposed about a common upright axis;
    b. partition wall means in each of said vessels subdividing such vessels into equal numbers of stationary feed chambers;
    c. a plurality of stationary material-handling vessels each associated with a respective one of the feed chambers forming a part of one of the annular stationary vessels, each material-handling vessel being adapted to receive flowable material from one feed chamber of each of said concentric annular stationary vessels and to separate the flowable materials thus received into solid and liquid components;
    d. conduit means interconnecting each of said feed chambers with the respective material-handling vessel and adapted to direct flowable material from said feed chamber to said vessel;
    e. a plurality of distributor chambers each adapted to receive flowable material and each arranged to feed said flowable material to a respective one of said annular stationary vessels;
    f. a plurality of flowable material discharge ducts, each of said ducts being connected to a respective one of said plurality of distributor chambers and being adapted to direct said flowable material from said chamber to the associated annular stationary vessel; and
    g. means for rotating at least the outlet end of each of said discharge ducts about said common upright axis and above the series of stationary feed chambers constituting the respective annular stationary vessel so as to effect annular distribution of said flowable material to the associated series of feed chambers and to feed each quantity of material from a feed chamber to the associated material-handling vessel for combination with the quantities of material similarly received in said material-handling vessel from other feed chambers connected thereto.

7. A filtration apparatus comprising a vertical shaft, means for rotating said shaft, a feed box mounted upon said shaft for rotation therewith, an outlet in said feed box, a distribution box surrounding said feed box and adapted to receive material to be filtered as it is annularly distributed from said feed box by discharge from said outlet, at least two partition members dividing said distribution box into at least two compartments, an outlet from each of said compartments, a line connecting each of said outlets with a receptacle for receiving a portion of material to be filtered from a respective one of said compartments, a tank for receiving filtered solids from each of said receptacles and conduit means having valve means therein interconnecting said receptacles and said tank and adapted under operation of said valve means to discharge solids from each of said receptacles to said tank to effect recycling of material from each of said receptacles to said tank and to effect recycling of material reslurried in said tank to said feed box.

8. A filtration apparatus as claimed in claim 7, wherein said distribution box has a cover member forming a pressure vessel within which said feed box rotates, and a source of a pressure medium being connectable to said distribution box for effecting distribution of the flowable material under elevated pressure.

9. A filtration apparatus as claimed in claim 7, wherein rotary valve means are provided for controlling said recycling steps and said rotary valve means are adapted for rotation upon said vertical shaft.

10. A method of subjecting a flowable material consisting essentially of solid and liquid components to a separation effect in order to separate the solid component and the liquid component, comprising feeding said flowable material to an outlet, distributing said flowable material annularly about an upright axis by rotating said outlet about said axis, subdividing the distributed material into a plurality of separate portions each containing the solid and liquid components of said flowable material, subjecting each portion of the material successively to filtration to separate the solids therein from the liquid therein, combining and recovering the separated solids; and recovering separately the liquid components.